United States Patent
Kwak et al.

(10) Patent No.: US 12,495,366 B2
(45) Date of Patent: Dec. 9, 2025

(54) METHOD OF MANAGING INTERCELL INTERFERENCE IN NETWORK AND APPARATUS FOR PERFORMING THE METHOD

(71) Applicant: ELECTRONICS AND TELECOMMUNICATIONS RESEARCH INSTITUTE, Daejeon (KR)

(72) Inventors: Jeongho Kwak, Daegu (KR); Yunhee Cho, Daejeon (KR); Sung Kyung Kim, Daejeon (KR); JeeHyeon Na, Daejeon (KR); Suyoung Ahn, Pohang-si (KR); Joonpyo Hong, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 526 days.

(21) Appl. No.: 18/093,204

(22) Filed: Jan. 4, 2023

(65) Prior Publication Data
US 2023/0224821 A1 Jul. 13, 2023

(30) Foreign Application Priority Data
Jan. 11, 2022 (KR) .................. 10-2022-0004311

(51) Int. Cl.
*H04W 52/24* (2009.01)
*H04L 5/00* (2006.01)

(52) U.S. Cl.
CPC ......... *H04W 52/243* (2013.01); *H04L 5/0032* (2013.01)

(58) Field of Classification Search
CPC . H04W 52/243; H04W 52/146; H04W 52/42; H04W 52/143; H04W 16/28;
(Continued)

(56) References Cited

U.S. PATENT DOCUMENTS 9,692,492 B2  6/2017  You
10,541,850 B2 * 1/2020  Gao ................ H04L 27/2655
(Continued)

FOREIGN PATENT DOCUMENTS

KR   10-1101722 B1  1/2012
KR   10-2013-0104337 A  9/2013
(Continued)

OTHER PUBLICATIONS

Yu W, Kwon T, Shin C. Multicell coordination via joint scheduling, beamforming, and power spectrum adaptation. IEEE Transactions on Wireless Communications. Jun. 6, 2013;12(7):1-4. (Year: 2013).*
Jaehwan Jeong et al., "Energy-Efficient Beam Scheduling for Orthogonal Random Beamforming in Cooperative Networks", 2017 15th International Symposium on Modeling and Optimization in Mobile, Ad Hoc, and Wireless Networks (WiOpt).
(Continued)

*Primary Examiner* — Fayyaz Alam
(74) *Attorney, Agent, or Firm* — LRK PATENT LAW FIRM (57) ABSTRACT

A method of managing intercell interference in a network and an apparatus for performing the method are disclosed. The method of managing intercell interference by a base station included in the network includes selecting a beam pattern from among a plurality of beam patterns for transmitting and receiving data between the base station and users included in the network, activating a beam corresponding to the selected beam pattern, performing a user's scheduling on users included in the activated beam, and allocating transmission power to the activated beam to transmit and receive data to and from the users selected by the user's scheduling.

20 Claims, 6 Drawing Sheets

(58) Field of Classification Search
CPC .. H04W 16/32; H04W 72/535; H04L 5/0032; H04L 5/0025; H04L 5/006; H04L 5/0098; H04B 7/0408; H04B 7/0695
See application file for complete search history.

(56) References Cited

U.S. PATENT DOCUMENTS

| | | | |
|---|---|---|---|
| 2009/0080391 | A1 | 3/2009 | Kwon et al. |
| 2018/0332625 | A1* | 11/2018 | Tsai ...................... H04B 7/088 |
| 2020/0119790 | A1 | 4/2020 | Rao et al. |
| 2023/0170976 | A1* | 6/2023 | Metwaly Saad ..... H04B 7/0696 375/347 |

FOREIGN PATENT DOCUMENTS

| | | |
|---|---|---|
| KR | 10-2016-0140350 A | 12/2016 |
| KR | 10-2103667 B1 | 4/2020 |

OTHER PUBLICATIONS

Ziyuan Sha et al., "Graph Theory Based Beam Scheduling for Inter-Cell Interference Avoidance in MmWave Cellular Networks", IEEE vol. 69, No. 4, Apr. 2020.
Wei Yu et al., "Multicell Coordination via Joint Scheduling, Beamforming and Power Spectrum Adaptation", IEEE, Jul. 2013.
Joonpyo Hong, "Spatio-Temporal Degree of Freedom: Interference Management in 5G Edge SON Networks", ICOIN 2021.

* cited by examiner

METHOD OF MANAGING INTERCELL INTERFERENCE IN NETWORK AND APPARATUS FOR PERFORMING THE METHOD

CROSS-REFERENCE TO RELATED APPLICATION(S)

This application claims the priority benefit of Korean Patent Application No. 10-2022-0004311 filed on Jan. 11, 2022, in the Korean Intellectual Property Office, the disclosure of which is incorporated herein by reference for all purposes.

BACKGROUND

1. Field of the Invention

One or more example embodiments relate to a method of managing intercell interference and an apparatus for performing the method.

2. Description of Related Art

Recently, mobile data usage has explosively increased, and such an increase is expected to continue. To solve problems caused by the increasing mobile data usage, research related to securing a frequency band by using a millimeter wave (mm Wave) is underway.

A mmWave may be mainly used in a small cell environment supporting short-range communication in regions where data demands are high because the mm Wave is sensitive to a path loss and blocking. In this case, a method of managing intercell interference may be necessary.

The above description has been possessed or acquired by the inventor(s) in the course of conceiving the present disclosure and is not necessarily an art publicly known before the present application is filed.

SUMMARY

Various aspects may determine a beam to be activated with a low complexity algorithm through beam activation based on a selection probability of each of a plurality of beam patterns for wireless communication.

Various aspects may effectively increase throughput (e.g., a transmission rate) while decreasing an interference value by controlling transmission power based on the interference value applied to a user by an activated beam.

Various aspects may adjust a power consumption of all base stations based on communication traffic by receiving information on each base station from the base stations included in a network and controlling the transmission power of each base station by a server.

However, the technical aspects are not limited to the foregoing aspects, and there may be other technical aspects.

According to various aspects, a method of managing intercell interference by a base station included in a network includes selecting a beam pattern from among a plurality of beam patterns for transmitting and receiving data between the base station and users included in the network, activating a beam corresponding to the selected beam pattern, performing a user's scheduling on users included in the activated beam, and allocating transmission power to the activated beam to transmit and receive data to and from the users selected by the user's scheduling.

The method of managing intercell interference may further include calculating a partial derivative of a utility in the base station with respect to the plurality of beam patterns, transmitting the partial derivative to a server configured to control the base station in the network, receiving, from the server, a selection probability of the plurality of beam patterns calculated by using the partial derivative, in which the utility includes a factor on data throughput of the base station and a factor on fairness between the selected user and unselected users.

The selecting the beam pattern may include randomly selecting the beam pattern based on the selection probability.

The selection probability may be updated such that the utility is maximized.

The performing the user's scheduling may include performing the user's scheduling such that the activated beam is configured to select at most one user.

The method of managing intercell interference may further include, for the allocating the transmission power, transmitting an interference value, a fairness queue, an index of the users included in the network, and the transmission power allocated to the activated beam to a server configured to control the base station in the network and receiving, from the server, a power sharing queue calculated based on the interference value, the fairness queue, the index of the users, and the allocated transmission power, in which the interference value and the fairness queue are associated with the selected user.

The allocating the transmission power may include allocating the transmission power based on data throughput of the base station, the interference value, the fairness queue, and the power sharing queue.

The interference value may include an interference value applied to reference users including the selected user, in which the fairness queue includes a factor on fairness between the selected user and unselected users.

The reference users may include a user, of the selected users, to which an interference value applied by the activated beam in the network is the largest and a user, of users selected by another base station different from the base station, to which an interference value applied by the activated beam in the network is the largest.

According to various aspects, a method of managing intercell interference by a server configured to control one or more base stations included in a network includes receiving, from the base stations, a partial derivative of a utility of the base stations, calculating, based on the partial derivative, a selection probability of a plurality of beam patterns for transmitting and receiving data between the base stations and users included in the network, transmitting the selection probability to the base stations, receiving, from the base stations, an index of the users included in the network, an interference value, a fairness queue, and transmission power allocated to a beam activated by the base stations, calculating a power sharing queue based on the receive index of the users, the interference value, the fairness queue, and the allocated transmission power, and transmitting the power sharing queue to the base stations, in which the interference value and the fairness queue are associated with users selected by a user's scheduling of the base stations, and the activated beam is an activated beam corresponding to a beam pattern randomly selected, based on the selection probability, by the base stations.

The interference value may include interference values respectively applied to users to which the interference values respectively applied by the activated beam are the largest and the second-largest among the selected users and the fairness queue may include a factor on fairness between the selected user and unselected users.

The calculating the selection probability may include updating the selection probability such that the utility is maximized, in which the utility includes a factor on data throughput of the base stations and a factor on fairness between the selected user and unselected users.

According to various aspects, a base station for managing intercell interference in a network includes a memory including instructions and a processor electrically connected to the memory and configured to execute the instructions, in which, when the processor executes the instructions, the processor is configured to select a beam pattern from among a plurality of beam patterns for transmitting and receiving data between the base station and users included in the network, activate a beam corresponding to the selected beam pattern, perform a user's scheduling on users included in the activated beam, and allocate transmission power to the activated beam to transmit and receive data to and from the users selected by the user's scheduling.

The processor may calculate a partial derivative of a utility of the base station with respect to the plurality of beam patterns, transmit the partial derivative to a server configured to control the base station in the network, and receive, from the server, a selection probability of the plurality of beam patterns calculated by using the partial derivative, in which the utility includes a factor on data throughput of the base station and a factor on fairness between the selected user and unselected users.

The processor may randomly select the beam pattern based on the selection probability.

The selection probability may be updated such that the utility is maximized.

The processor may perform the user's scheduling such that the activated beam is configured to select at most one user.

The processor may transmit an interference value, a fairness queue, an index of the users included in the network, and the transmission power allocated to the activated beam to a server configured to control the base station in the network, receive, from the server, a power sharing queue calculated based on the interference value, the fairness queue, the index of the users, and the allocated transmission power, and allocate the transmission power based on data throughput of the base station, the interference value, the fairness queue, and the power sharing queue, in which the interference value and the fairness queue are associated with the selected user.

The interference value may include an interference value applied to reference users comprising the selected user, in which the fairness queue includes a factor on fairness between the selected user and unselected users.

The reference users may include a user, of the selected users, to which an interference value applied by the activated beam in the network is the largest and a user, of users selected by another base station different from the base station, to which an interference value applied by the activated beam in the network is the largest.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

The following detailed structural or functional description is provided as an example only and various alterations and modifications may be made to the examples. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like elements and a repeated description related thereto will be omitted.

Figure 1:
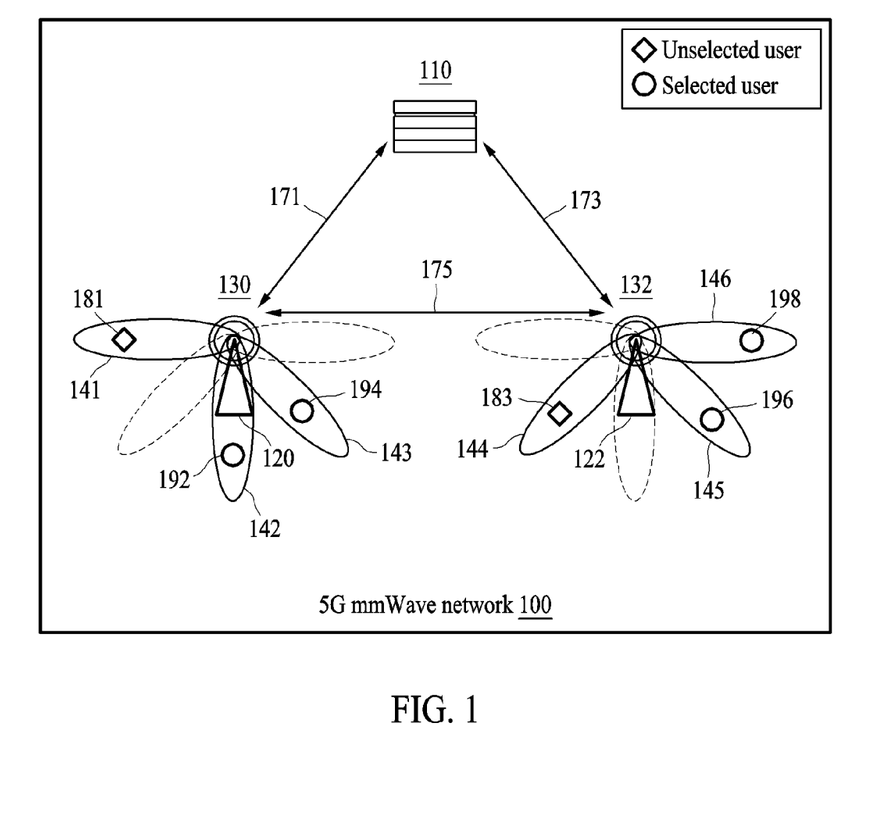
FIG. 1 is a diagram illustrating a network according to various embodiments.

FIG. 1 is a diagram illustrating a network according to various embodiments.

Referring to FIG. 1, a network 100 (e.g., a 5th generation (5G) millimeter wave (mmWave) network) may include a server 110 (e.g., an EdgesSON server or an EdgeSON server device) and one or more base stations 120 and 122. The server 110 may control (e.g., beam activation, a user's scheduling, and/or power allocation) the base stations 120 and 122 in the network 100.

The base stations 120 and 122 may perform one or more operations among beam activation, a user's scheduling, and power allocation (e.g., power allocation optimization) by control of the server 110, and maximize the utility of the base stations 120 and 122 in the network 100, and minimize intercell interference. A signal needed to control the base stations 120 and 122 by the server 110 may be transmitted and received between the server 110 and the base stations 120 and 122 by wire or wirelessly. The base stations 120 and 122 may select one of a plurality of beam patterns 130 and 132 for transmitting and receiving data to and from a user in the network 100 and activate a beam corresponding to either the beam pattern 130 or 132. The base stations 120 and 122 may select a user to and from which the base stations 120 and 122 transmit and receive data from among users in activated beams 141, 142, 143, 144, 145, and 146. The base stations 120 and 122 may allocate optimal transmission power to the activated beams 141, 142, 143, 144, 145, and 146 to decrease intercell interference.

Figure 2:
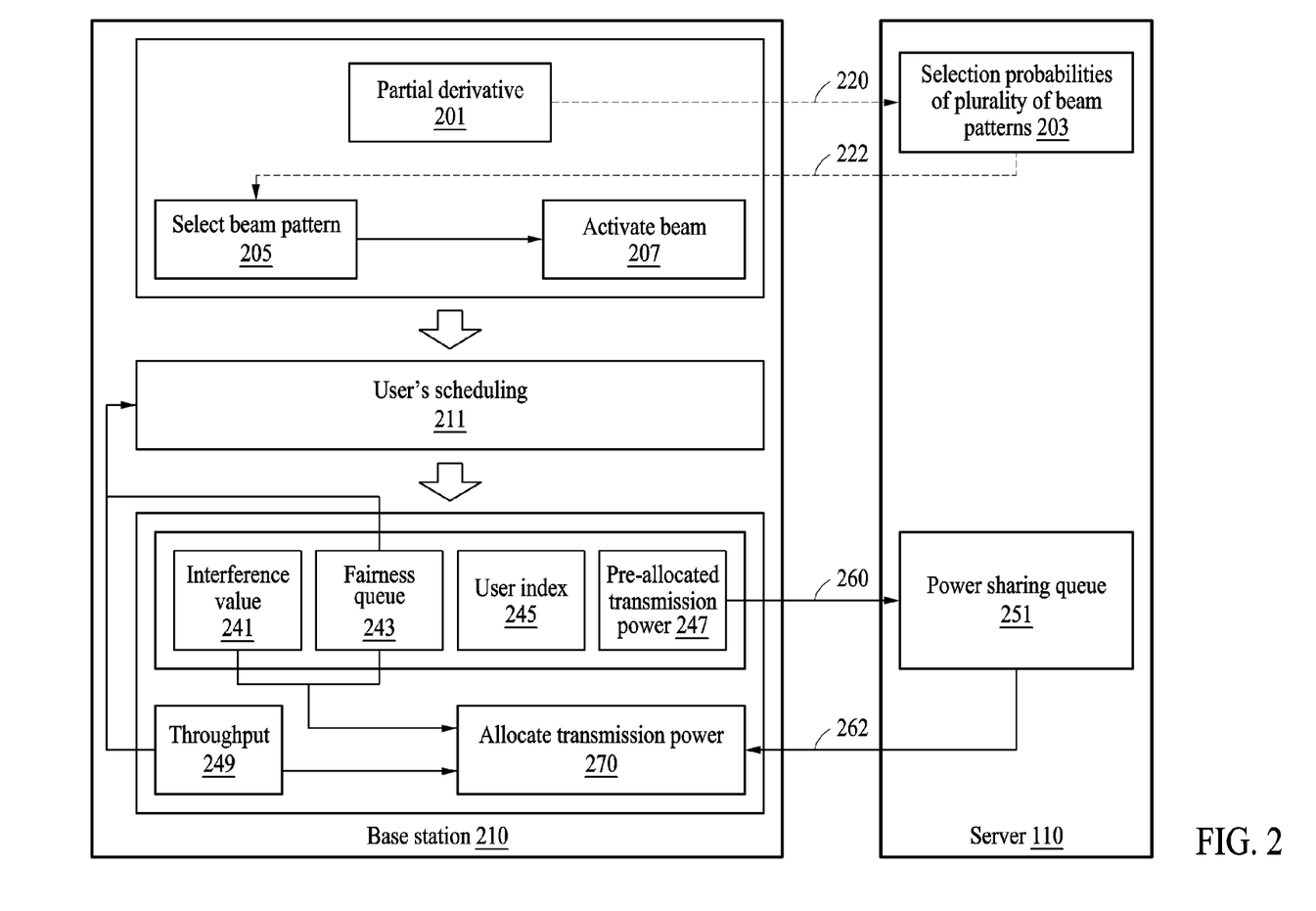
FIG. 2 is a diagram illustrating a method of managing intercell interference, according to various embodiments.

FIG. 2 is a diagram illustrating a method of managing intercell interference, according to various embodiments.

Referring to FIG. 2, a base station 210 (e.g., the base stations 120 and 122 of FIG. 1) may perform one or more operations among beam activation, a user's scheduling, and power allocation (e.g., power allocation optimization). Accordingly, the base station 210 may maximize the utility of the base station 210 in a network (e.g., the network 100 of FIG. 1) environment and minimize intercell interference.

The base station 210 may perform beam activation. First, the base station 210 may select a beam pattern (e.g., the beam patterns 130 and 132 of FIG. 1) from among a plurality of beam patterns for transmitting and receiving data to and from a user (e.g., users 181, 183, 192, 194, 196, and 198 of FIG. 1) included in a network. For example, in operation 205, the base station 210 may randomly select a beam pattern from among a plurality of beam patterns based on selection probabilities of the plurality of beam patterns. Then, the base station 210, in operation 207, may activate a beam corresponding to the selected beam pattern.

The selection probability of the plurality of beam patterns may be calculated by a server 110, and the server 110 may calculate the selection probability by using information transmitted by the base station 210. Hereinafter, the calculation of the selection probability is described in detail. The base station 210 may calculate a partial derivative 201 of the utility of the base station 210. The utility may include a factor on throughput (e.g., a transmission rate) of the base station 210 and a factor on fairness between selected users (e.g., the users 192, 194, 196, and 198 of FIG. 1) and unselected users (e.g., the users 181 and 183 of FIG. 1). The partial derivative 201 may be represented by Equation 1.

$$D_a^{(n)} \triangleq \frac{\partial U^{(n)}}{\partial \pi_a} = \sum_k U_k'(R_k) \cdot \frac{\partial R_k}{\partial \pi_a}$$ [Equation 1]

In this case, $\Sigma_k U_k(R_k)$ denotes a total of the utilities of all base stations (e.g., the base stations 120 and 122 of FIG. 1) and $\pi_a$ denotes a selection probability of a beam pattern among a plurality of beam patterns.

In operation 220, the base station 210 may transmit the partial derivative 201 to the server 110. In this case, operation 220 may be performed at every timeslot. The server 110 may calculate selection probabilities 203 of the plurality of beam patterns by using the partial derivative 201. A total of the selection probabilities 203 of the plurality of beam patterns may be represented by Equation 2.

$$\Sigma_a \pi_k^n = 1, \forall n$$ [Equation 2]

Equation 2 may represent the total of the selection probabilities 203 of the plurality of beam patterns is 1.

The server 110 may update the selection probabilities 203 of the plurality of beam patterns such that the total of the utilities of all the base stations (e.g., the base stations 120 and 122 of FIG. 1) is maximized. In operation 222, the server 110 may transmit the selection probabilities 203 of the plurality of beam patterns to the base station 210. Operation 222 may be performed at every timeslot.

After a beam is activated for data transmission and reception by the base station 210, the base station 210 may perform a user's scheduling 211 for selecting a user to and from which the base station 210 transmits and receives data and/or allocate transmission power to the activated beam in operation 270 to maximize the utility of the base station 210 and decrease intercell interference. Constraints on maximizing the utility of the base station 210 may be average transmission power of the base station 210 per hour, maximum transmission power of the base station 210, and maximum transmission power of a beam, which may be represented by Equation 3.

$$\max_{(I,p,\gamma)} \sum_k U_k(R_k)$$ [Equation 3]

is subjected to $\lim_{T\to\infty} \frac{1}{T} \sum_{t=0}^{T-1} \sum_{n=1}^{N} \sum_{b=1}^{B} p_{n,b}(t) \leq P_{arg}$ $\sum_b p_{n,b}(t) \leq P_{n,max}, \forall n$ $p_{n,b}(t) \leq p_{n,b}^{max}, \forall n, \forall b$ Equation 3 may be replaced by a problem to be solved by each timeslot by using the property of Jensen's inequality. To solve the problem by using a Lyapunov optimization technique, a power sharing queue Z(t) 251 and a fairness queue $W_k(t)$ 243, that is, virtual queues, may be defined as Equation 4.

$$W_k(t+1) = [W_k(t) + \gamma_k(t) - r_k(I(t), p(t))]^+, \forall k$$ [Equation 4]

$$Z(t+1) = \left[Z(t) + \sum_{n=1}^{N}\sum_{b=1}^{B} p_{n,b}(t) - P_{avg}\right]^+$$

In this case, the fairness queue 243 may be a factor on fairness between users (e.g., the users 192, 194, 196, and 198 of FIG. 1) selected by a base station (e.g., the base stations 120 and 122 of FIG. 1) and users (e.g., the users 181 and 183 of FIG. 1) unselected by the base station. The power sharing queue 251 is described in detail below with reference to the description of a method of the server 110 controlling the transmission power allocation in operation 270 by the base station 210. $\gamma_k$ may be an auxiliary variable and may follow a real-time transmission rate $r_k(t)$ (e.g., throughput). Maximizing a real-time objective function (e.g., the utility of the base station 210) while stabilizing a power sharing queue and a fairness queue may be important. To stabilize the power sharing queue and the fairness queue, a Lyapunov function may be defined as Equation 5.

$$L(t) = \frac{1}{2}\left\{Z^2(t) + \sum_k (W_k(t))^2\right\}$$ [Equation 5]

$$Q(t) = \{Z(t), W_1(t), \ldots, W_k\}$$

In this case, $\Delta(L(t))=L(t+1)-L(t)$ may be a Lyapunov drift function, and a Lyapunov drift-minus-benefit (DMB) function may be defined as Equation 6 by further including the real-time objective function (e.g., the utility of the base station 210).

$$DMB(p(t),I(t),\gamma(t))=\Delta(L(t))-V\Sigma_k E\{\log(1+\gamma_k)|Q(t)\}$$ [Equation 6]

Here, E denotes an expected value. A controllable variable in Equation 6 may be $\gamma_k(t)$, p(t), I(t), and an equation further including an auxiliary variable may be represented by Equation 7.

$$\gamma_k(t):\max_{\gamma_k(t)} V\log(1+\gamma_k(t)) - \gamma_k(t)W_k(t), \forall k$$ [Equation 7]

Equation 7 may be a convex function and be reduced to Equation 8 through differentiation.

$$\gamma_k(t) = \left[\frac{V}{W_k} - 1\right]_{min}^{max}, \forall k$$ [Equation 8]

An equation including transmission power p(t) and a user's scheduling I(t), which are the remaining controllable variables except for $\gamma_k(t)$, may be represented by Equation 9.

$$\max_{I(t),p(t)} \sum_k r_k(I(t), p(t))W_k(t) - \sum_n \sum_b p_{n,b}(t)Z(t)$$ [Equation 9]

Equation 9 may not be a convex function, and using Equation 9 when the base station 210 allocates, in operation 270, the user's scheduling 211 and transmission power may increase complexity.

To decrease complexity, the base station 210 may perform the user's scheduling 211 for selecting at most one user by using an argument of maxima (argmax) function with respect to a multiplication of a transmission rate (e.g., data throughput 249) with the fairness queue 243 as in Equation 11. Here, argmax f(x) may be an input x that generates a maximum value of f(x).

$$I_{b_n k} = \begin{cases} 1, & \text{if } k = k(n, b) = \arg\max_{k \in K_a} r_k(p_n, b)W_k(t) \\ 0, & \text{otherwise} \end{cases}$$ [Equation 10]

The base station 210 may allocate power to transmit data to activated beams (e.g., the activated beams 141, 142, 143, 144, 145, and 146 of FIG. 1). The transmission power allocation in operation 270 by the base station 210 may be controlled by the server 110 to efficiently accommodate the fluctuations in communication traffic of all the base stations (e.g., the base stations 120 and 122 of FIG. 1).

To control the transmission power allocation in operation 270 by the base station 210, the server 110 may need information on pre-allocated transmission power 247 to a beam activated by the base station 210, a user index 245 (e.g., user information) in the network 100, the fairness queue 243, and an interference value 241 applied to selected users (e.g., the users 192, 194, 196, and 198 of FIG. 1). The interference value 241 may be calculated by the base station 210.

The base station 210 may only calculate the interference value 241 applied to two users (e.g., reference users) in the network 100 to decrease the complexity of the calculation of the interference value 241. A method of calculating an interference value by the base station 210 is described in detail below by using the base station 120 of FIG. 1 as an example.

The base station 120 may use, as a reference user, a user to which an interference value applied by the activated beams 141, 142, 143, 144, 145, and 146 is the largest of the users 192 and 194 selected through the user's scheduling 211 by the base station 120 and a user to which an interference value applied by the activated beams 141, 142, 143, 144, 145, and 146 is the largest of the users 196 and 198 selected through the user's scheduling 211 by another base station (e.g., the base station 122 of FIG. 1). The base station 120 may receive, in operation 175, the interference value applied to the users 196 and 198 selected by the base station (e.g., the base station 122 of FIG. 1) from the base station (e.g., the base station 122 of FIG. 1) included in the network 100 to calculate the interference value 241.

The server 110 may receive, from the base station 210, the interference value 241, the fairness queue 243, the user index 245, and the pre-allocated transmission power 247 and may calculate the power sharing queue 251 based thereon. The power sharing queue 251 may be a factor that differentiates transmission power of each base station (e.g., the base stations 120 and 122 of FIG. 1) based on communication traffic of each base station (e.g., the base stations 120 and 122 of FIG. 1) to manage a total power consumption of the base stations (e.g., the base stations 120 and 122 of FIG. 1) included in the network 100, maximize the utility thereof, and decrease intercell interference in the network 100. The server 110 may transmit, in operation 262, the calculated power sharing queue 251 to the base station 210.

The base station 210 may allocate, in operation 270, transmission power of the base station 210 to activated beams, based on the data throughput 249 (e.g., a transmission rate) of the base station 210, the interference value 241, the fairness queue 243, and the power sharing queue 251 received from the server 110.

Figure 3A:
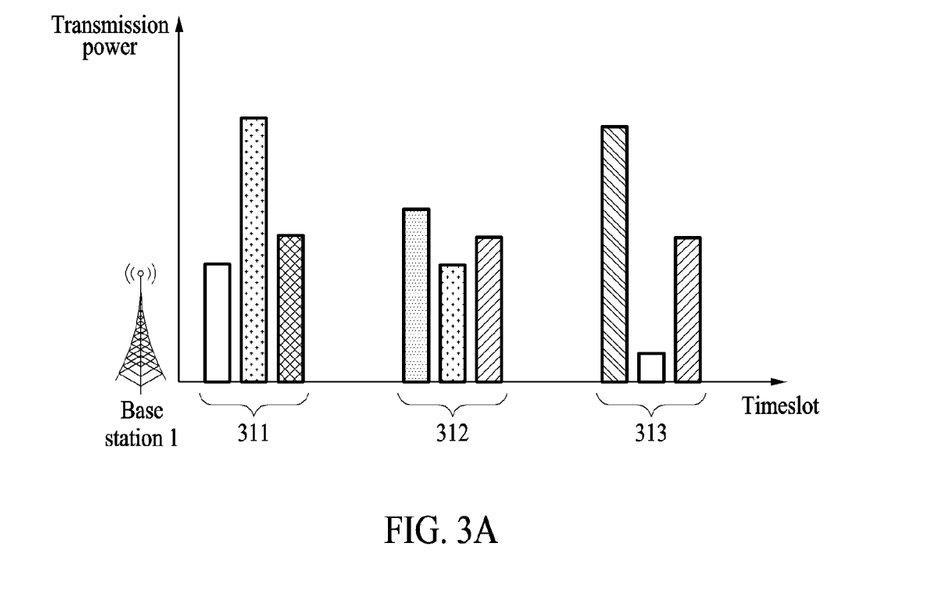
FIGS. 3A and 3B are each a diagram illustrating transmission power allocated to a beam activated by a base station, according to various embodiments.
Figure 3B:
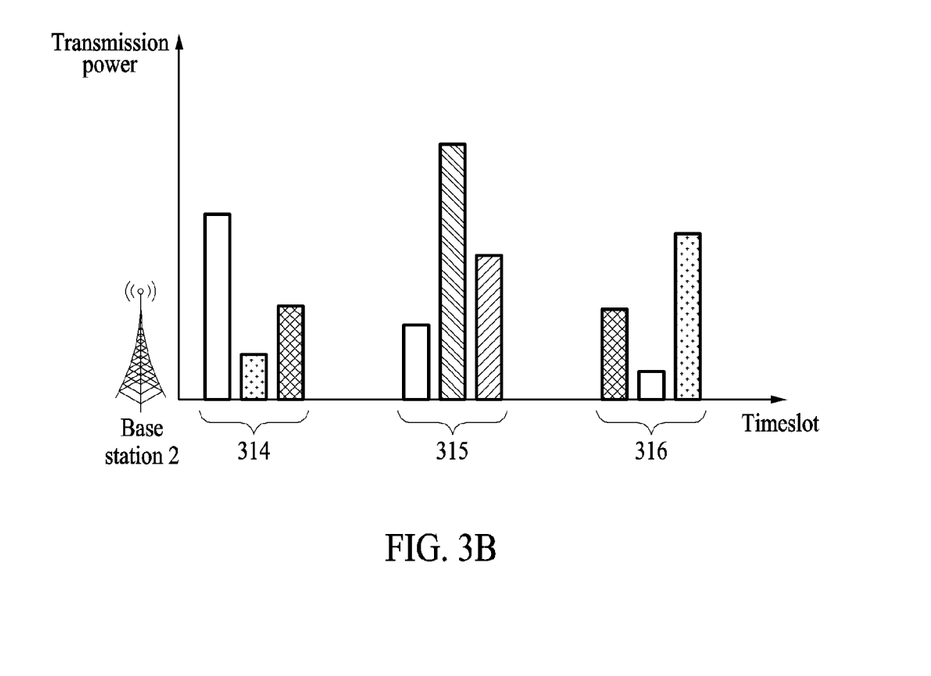

FIGS. 3A and 3B are each a diagram illustrating transmission power allocated to a beam activated by a base station, according to various embodiments.

Referring to FIGS. 3A and 3B, the pattern and transmission power of each activated beam may vary depending on base stations (e.g., the base stations 120 and 122 of FIG. 1) and timeslots 311, 312, 313, 314, 315, and 316. The varying pattern and transmission power may be a result of various embodiments to maximize the utility of the base stations and decrease intercell interference based on communication traffic varying depending on the base stations and timeslots.

Figure 4:
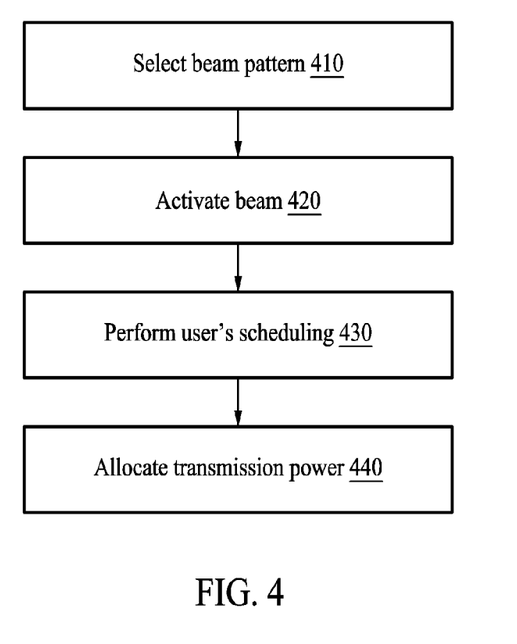
FIG. 4 is a flowchart illustrating a method of managing intercell interference by a base station in a network, according to various embodiments.

FIG. 4 is a flowchart illustrating a method of managing intercell interference by a base station in a network, according to various embodiments.

In operation 410, the base station (e.g., the base station 210 of FIG. 2) may select a beam pattern from among a plurality of beam patterns for transmitting and receiving data between the base station and a user included in the network (e.g., the network 100 of FIG. 1).

In operation 420, the base station may activate a beam corresponding to the selected beam pattern.

In operation 430, the base station may perform a user's scheduling on a user included in the activated beam.

In operation 440, the base station may allocate transmission power to the activated beam to transmit and receive data to and from a user selected by the user's scheduling.

The base station may transmit and receive data needed for operations 410 to 440 to and from a server (e.g., the server 110 of FIG. 2) for controlling the base station included in the network.

Figure 5:
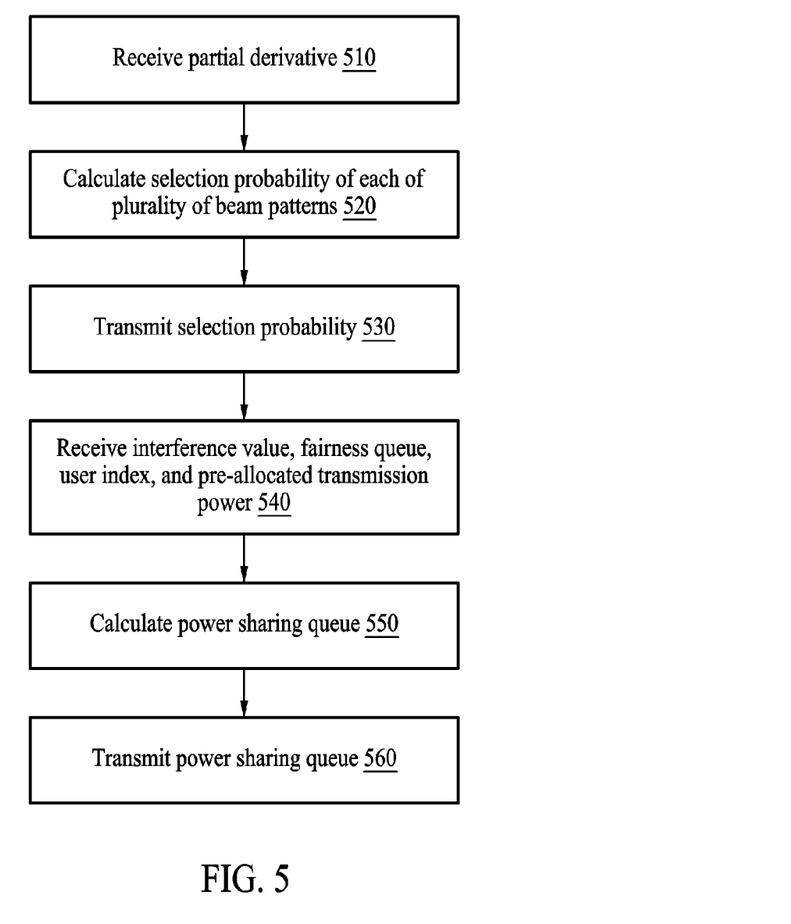
FIG. 5 is a flowchart illustrating a method of managing intercell interference by a server for controlling a base station in a network, according to various embodiments.

FIG. 5 is a flowchart illustrating a method of managing intercell interference by a server for controlling a base station in a network, according to various embodiments.

In operation 510, the server (e.g., the server 110 of FIG. 2) may receive, from the base station (e.g., the base station 210 of FIG. 2), a partial derivative of the utility of the base station.

In operation 520, the server, based on the partial derivative, may calculate a selection probability of each of a plurality of beam patterns for the base station transmitting and receiving data to and from a user included in the network (e.g., the network 100 of FIG. 1).

In operation 530, the server may transmit the selection probability to the base station.

In operation 540, the server may receive, from the base station, an index of the user included in the network, an interference value, a fairness queue, and transmission power pre-allocated to a beam activated by the base station.

In operation 550, the server may calculate a power sharing queue based on the received index of the user, the interference value, the fairness queue, and the pre-allocated transmission power.

In operation 560, the server may transmit the power sharing queue to the base station.

Figure 6:
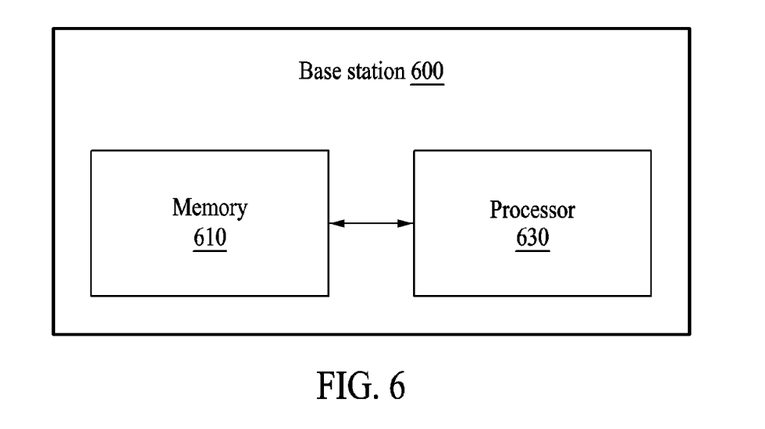
FIG. 6 is a block diagram illustrating a base station according to various embodiments.

FIG. 6 is a block diagram illustrating a base station according to various embodiments.

Referring to FIG. 6, a base station 600 may be practically the same as the base stations 120, 122, and 210 of FIGS. 1 to 5. The base station 600 may include a memory 610 and a processor 630.

The memory 610 may store instructions (e.g., a program) executable by the processor 630. For example, the instructions may include instructions for performing an operation of the processor 630 and/or an operation of each component of the processor 630.

According to various embodiments, the memory 610 may be implemented as a volatile memory device or a non-volatile memory device. The volatile memory device may be implemented as dynamic random-access memory (DRAM), static random-access memory (SRAM), thyristor RAM (T-RAM), zero capacitor RAM (Z-RAM), or twin transistor RAM (TTRAM). The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), holographic memory, a molecular electronic memory device, and/or insulator resistance change memory.

The processor 630 may execute computer-readable code (e.g., software) stored in the memory 610 and instructions triggered by the processor 630. The processor 630 may be a hardware data processing device having a circuit that is physically structured to execute desired operations. The desired operations may include code or instructions in a program. The hardware data processing device may include a microprocessor, a central processing unit (CPU), a processor core, a multi-core processor, a multiprocessor, an application-specific integrated circuit (ASIC), and/or a field-programmable gate array (FPGA).

According to various embodiments, operations performed by the processor 630 may be practically the same as the operations performed by the base stations 120, 122, and 210 described with reference to FIGS. 1 to 5. Accordingly, further description thereof is not repeated herein.

Figure 7:
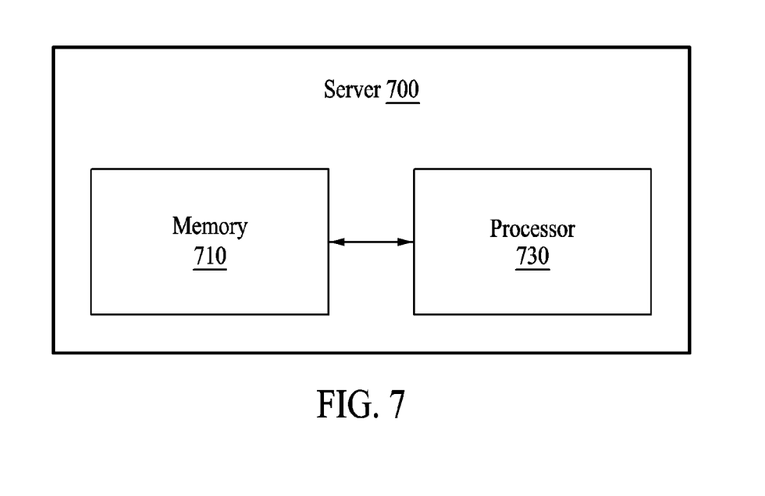
FIG. 7 is a block diagram illustrating a server according to various embodiments.

FIG. 7 is a block diagram illustrating a server according to various embodiments.

Referring to FIG. 7, a server 700 may be practically the same as the server 110 of FIGS. 1 to 5. The server 700 may include a memory 710 and a processor 730.

The memory 710 may store instructions (e.g., a program) executable by the processor 730. For example, the instructions may include instructions for performing an operation of the processor 730 and/or an operation of each component of the processor 730.

According to various example embodiments, the memory 710 may be implemented as a volatile memory device or a non-volatile memory device. The volatile memory device may be implemented as DRAM, SRAM, T-RAM, Z-RAM, or TTRAM. The non-volatile memory device may be implemented as EEPROM, MRAM, STT-MRAM, CBRAM, FeRAM, PRAM, RRAM, nanotube RRAM, PoRAM, NFGM, holographic memory, a molecular electronic memory device, and/or insulator resistance change memory.

The processor 730 may execute computer-readable code (e.g., software) stored in the memory 710 and instructions triggered by the processor 730. The processor 730 may be a hardware data processing device having a circuit that is physically structured to execute desired operations. The desired operations may include code or instructions in a program. The hardware data processing device may include a microprocessor, a CPU, a processor core, a multi-core processor, a multiprocessor, an ASIC, and/or an FPGA.

According to various embodiments, operations performed by the processor 730 may be practically the same as the operations performed by the server 110 described with reference to FIGS. 1 to 5. Accordingly, further description thereof is not repeated herein.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), RAM, flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of managing intercell interference by a base station comprised in a network, the method comprising:
    selecting a beam pattern from among a plurality of beam patterns for transmitting and receiving data between the base station and users comprised in the network;
    activating a beam corresponding to the selected beam pattern;
    performing a user's scheduling on users comprised in the activated beam; and
    allocating transmission power to the activated beam to transmit and receive data to and from the users selected by the user's scheduling.

2. The method of claim 1, further comprising:
    calculating a partial derivative of a utility in the base station with respect to the plurality of beam patterns;
    transmitting the partial derivative to a server configured to control the base station in the network;
    receiving, from the server, a selection probability of the plurality of beam patterns calculated by using the partial derivative,
    wherein the utility comprises a factor on data throughput of the base station and a factor on fairness between the selected user and unselected users.

3. The method of claim 2, wherein the selecting the beam pattern comprises randomly selecting the beam pattern based on the selection probability.

4. The method of claim 2, wherein the selection probability is updated such that the utility is maximized.

5. The method of claim 1, wherein the performing the user's scheduling comprises performing the user's scheduling such that the activated beam is configured to select at most one user.

6. The method of claim 1, further comprising:
    for the allocating the transmission power,
    transmitting an interference value, a fairness queue, an index of the users comprised in the network, and the transmission power allocated to the activated beam to a server configured to control the base station in the network; and
    receiving, from the server, a power sharing queue calculated based on the interference value, the fairness queue, the index of the users, and the allocated transmission power,
    wherein the interference value and the fairness queue are associated with the selected user.

7. The method of claim 6, wherein the allocating the transmission power comprises allocating the transmission power based on data throughput of the base station, the interference value, the fairness queue, and the power sharing queue.

8. The method of claim 6, wherein:
    the interference value comprises an interference value applied to reference users comprising the selected user, and
    the fairness queue comprises a factor on fairness between the selected user and unselected users.

9. The method of claim 8, wherein the reference users comprise:
    a user, of the selected users, to which an interference value applied by the activated beam in the network is the largest; and
    a user, of users selected by another base station different from the base station, to which an interference value applied by the activated beam in the network is the largest.

10. A method of managing intercell interference by a server configured to control one or more base stations comprised in a network, the method comprising:
    receiving, from the one or more base stations, a partial derivative of a utility of the base stations;
    calculating, based on the partial derivative, a selection probability of a plurality of beam patterns for transmitting and receiving data between the base stations and users comprised in the network;
    transmitting the selection probability to the base stations;

receiving, from the base stations, an index of the users comprised in the network, an interference value, a fairness queue, and transmission power allocated to a beam activated by the base stations;

calculating a power sharing queue based on the receive index of the users, the interference value, the fairness queue, and the allocated transmission power; and transmitting the power sharing queue to the base stations, wherein the interference value and the fairness queue are associated with users selected by a user's scheduling of the base stations, and the activated beam is an activated beam corresponding to a beam pattern randomly selected, based on the selection probability, by the base stations.

11. The method of claim 10, wherein:

the interference value comprises interference values respectively applied to users to which the interference values respectively applied by the activated beam are the largest and the second-largest among the selected users, and the fairness queue comprises a factor on fairness between the selected user and unselected users.

12. The method of claim 10, wherein:

the calculating the selection probability comprises updating the selection probability such that the utility is maximized, the utility comprises a factor on data throughput of the base stations and a factor on fairness between the selected user and unselected users.

13. A base station for managing intercell interference in a network, the base station comprising:

a memory comprising instructions and a processor electrically connected to the memory and configured to execute the instructions, wherein when the processor executes the instructions, the processor is configured to:

select a beam pattern from among a plurality of beam patterns for transmitting and receiving data between the base station and users comprised in the network;

activate a beam corresponding to the selected beam pattern;

perform a user's scheduling on users comprised in the activated beam; and allocate transmission power to the activated beam to transmit and receive data to and from the users selected by the user's scheduling.

14. The base station of claim 13, wherein the processor is configured to:

calculate a partial derivative of a utility of the base station with respect to the plurality of beam patterns;

transmit the partial derivative to a server configured to control the base station in the network; and receive, from the server, a selection probability of the plurality of beam patterns calculated by using the partial derivative, wherein the utility comprises a factor on data throughput of the base station and a factor on fairness between the selected user and unselected users.

15. The base station of claim 14, wherein the processor is configured to randomly select the beam pattern based on the selection probability.

16. The base station of claim 14, wherein the selection probability is updated such that the utility is maximized.

17. The base station of claim 13, wherein the processor is configured to perform the user's scheduling such that the activated beam is configured to select at most one user.

18. The base station of claim 13, wherein the processor is configured to:

transmit an interference value, a fairness queue, an index of the users comprised in the network, and the transmission power allocated to the activated beam to a server configured to control the base station in the network;

receive, from the server, a power sharing queue calculated based on the interference value, the fairness queue, the index of the users, and the allocated transmission power; and allocate the transmission power based on data throughput of the base station, the interference value, the fairness queue, and the power sharing queue, wherein the interference value and the fairness queue are associated with the selected user.

19. The base station of claim 18, wherein:

the interference value comprises an interference value applied to reference users comprising the selected user, the fairness queue comprises a factor on fairness between the selected user and unselected users.

20. The base station of claim 19, wherein the reference users comprise:

a user, of the selected users, to which an interference value applied by the activated beam in the network is the largest; and a user, of users selected by another base station different from the base station, to which an interference value applied by the activated beam in the network is the largest.

* * * * *